(12) United States Patent
Rodriguez Bravo et al.

(10) Patent No.: US 10,796,582 B1
(45) Date of Patent: Oct. 6, 2020

(54) AUTONOMOUS EMERGENCY EVACUATION

(71) Applicant: International Business Machines Corporation, Armonk, NY (US)

(72) Inventors: Cesar Augusto Rodriguez Bravo, Alajuela (CR); Shikhar Kwatra, Durham, NC (US); Sarbajit K. Rakshit, Kolkata (IN); Aaron K. Baughman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/438,864

(22) Filed: Jun. 12, 2019

(51) Int. Cl.
| | |
|---|---|
| G08B 25/08 | (2006.01) |
| G08B 25/10 | (2006.01) |
| H04W 4/22 | (2009.01) |
| G08G 1/00 | (2006.01) |
| H04W 4/90 | (2018.01) |
| G08B 27/00 | (2006.01) |
| G05D 1/02 | (2020.01) |

(52) U.S. Cl.
CPC ........... *G08G 1/202* (2013.01); *G05D 1/0225* (2013.01); *G08B 27/001* (2013.01); *G08G 1/22* (2013.01); *H04W 4/90* (2018.02)

(58) Field of Classification Search
CPC ................................................ G05B 19/0425
See application file for complete search history.

(56) References Cited

U.S. PATENT DOCUMENTS

| | | | |
|---|---|---|---|
| 7,134,088 B2* | 11/2006 | Larsen .................. | G09B 9/003 |
| | | | 715/765 |
| 8,406,986 B2* | 3/2013 | Boss ...................... | B61L 27/04 |
| | | | 701/117 |

(Continued)

FOREIGN PATENT DOCUMENTS

| | | |
|---|---|---|
| CN | 109448410 A | 3/2019 |
| DE | 102017125494 A1 | 5/2018 |

(Continued)

OTHER PUBLICATIONS

Youtube, "Hyundai—The Empty Car Convoy", Published on Jul. 1, 2014, 2 pages, https://www.youtube.com/watch?v=Xbjdmw8D9-Y.

(Continued)

*Primary Examiner* — Joseph H Feild
*Assistant Examiner* — Pameshanand Mahase
(74) *Attorney, Agent, or Firm* — James L. Olsen

(57) ABSTRACT

Aspects of the present disclosure relate to emergency evacuation. An emergency can be detected at an emergency location. A type of the emergency can be determined. Prospective safe locations proximate to the emergency location can be identified. A safety rating of each prospective safe location can be determined based on the type of emergency. A number of at-risk individuals at the emergency location can be determined. A subset of drop-off locations of the prospective safe locations that have a safety rating that satisfies a safety threshold can be selected, the subset of drop-off locations satisfying a size limit required for the number of at-risk individuals. A set of autonomous vehicles (Continued)

required for the number of at-risk individuals can then be determined. The set of autonomous vehicles can be deployed to the emergency location.

20 Claims, 8 Drawing Sheets

(56) References Cited

U.S. PATENT DOCUMENTS

| | | | |
|---|---|---|---|
| 2015/0039364 A1* | 2/2015 | Beraudier | G06Q 50/30 705/7.13 |
| 2016/0320193 A1* | 11/2016 | Tuukkanen | G01C 21/3461 |
| 2017/0108342 A1 | 4/2017 | Foreman et al. | |
| 2017/0265045 A1* | 9/2017 | Igumnov | H04W 4/90 |

FOREIGN PATENT DOCUMENTS

| | | |
|---|---|---|
| DE | 102017211797 A1 | 1/2019 |
| KR | 20160132789 A | 11/2016 |
| WO | 2015068249 A1 | 5/2015 |

OTHER PUBLICATIONS

Mell et al., "The NIST Definition of Cloud Computing", Recommendations of the National Institute of Standards and Technology, Sep. 2011, 7 pages.

* cited by examiner

```
<Action monitoring>
    <R-CNN analysis>:
        <User Action: region monitoring and user's reactions monitored in x-y
    coordinates>
                            <redaction studied and stored>
                            # Train or validation dataset
                            assert subset in ["train", "val"]
              dataset_dir = os.path.join(dataset_dir, subset)

#x and y coordinates of each region
                            annotations1 =
json.load(open(os.path.join(dataset_dir, "via_region_data.json")))
 annotations = list(annotations1.values()) # don't need the dict keys
  # The VIA tool saves images in the JSON even if they don't have any
    annotations = [a for a in annotations if a['regions']]
        </User annotates data analysis>
<LSTM with K-means clusters for risk stratification and predictive risk situation
taking into account object/area under focus and clusters tone analysis through
normalization and feature scaling>
{
    "clustered_set_tone": {
    "tones": [
            {
            "score": 0.6165,
            "tone_id": "danger level",
            "tone_name": "Safe mode"
            },
            {
            "score": 0.829888,
            "tone_id": "high risk",
            "tone_name": "Danger mode"
            }
            ]
        },
            "shortData": [
                {
                    "datetime": "2017-04-02T05:58:30.000",
                    "level": "5",
                    "seconds": <value>
                },
                <...>
            ]
        },
        "logId": <value>,
        "minutesAfterriskdetection": 2019-03-01T23:58:30.000
        "startTime": "",
        "Timeinevacuation": <value in minutes>,
        "type": "Stage2-evacuation_strategy"
    },
    <A Min-Max scaling is now done via the following equation:
            Xnorm=(X-Xmin)/(Xmax-Xmin)
    ]
}
Data_insight = {Correlation type- "pearson", data= P-ki cluster, Xnorm}
```

FIG. 8

AUTONOMOUS EMERGENCY EVACUATION

BACKGROUND

The present disclosure relates generally to the field of emergency evacuation.

Autonomous vehicles are capable of traveling from a starting point to a destination with little to no user input. To achieve this, autonomous vehicles leverage sensor data from a variety of sensors to perceive their surroundings. Autonomous vehicles have a variety of benefits, including, among others, safety, efficiency, and customer satisfaction.

SUMMARY

Embodiments of the present disclosure include a method, system, and computer program product for evacuating at-risk individuals during an emergency. An emergency can be detected at an emergency location. A type of the emergency can be determined. Prospective safe locations proximate to the emergency location can be identified. A safety rating of each prospective safe location can be determined based on the type of emergency. A number of at-risk individuals at the emergency location can be determined. A subset of drop-off locations of the prospective safe locations that have a safety rating that satisfies a safety threshold can be selected, the subset of drop-off locations satisfying a size limit required for the number of at-risk individuals. A set of autonomous vehicles required for the number of at-risk individuals can then be determined. The set of autonomous vehicles can be deployed to the emergency location.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 8 is a diagram illustrating an example code for implementing risk stratification and prediction, in accordance with embodiments of the present disclosure.

Figure 1:
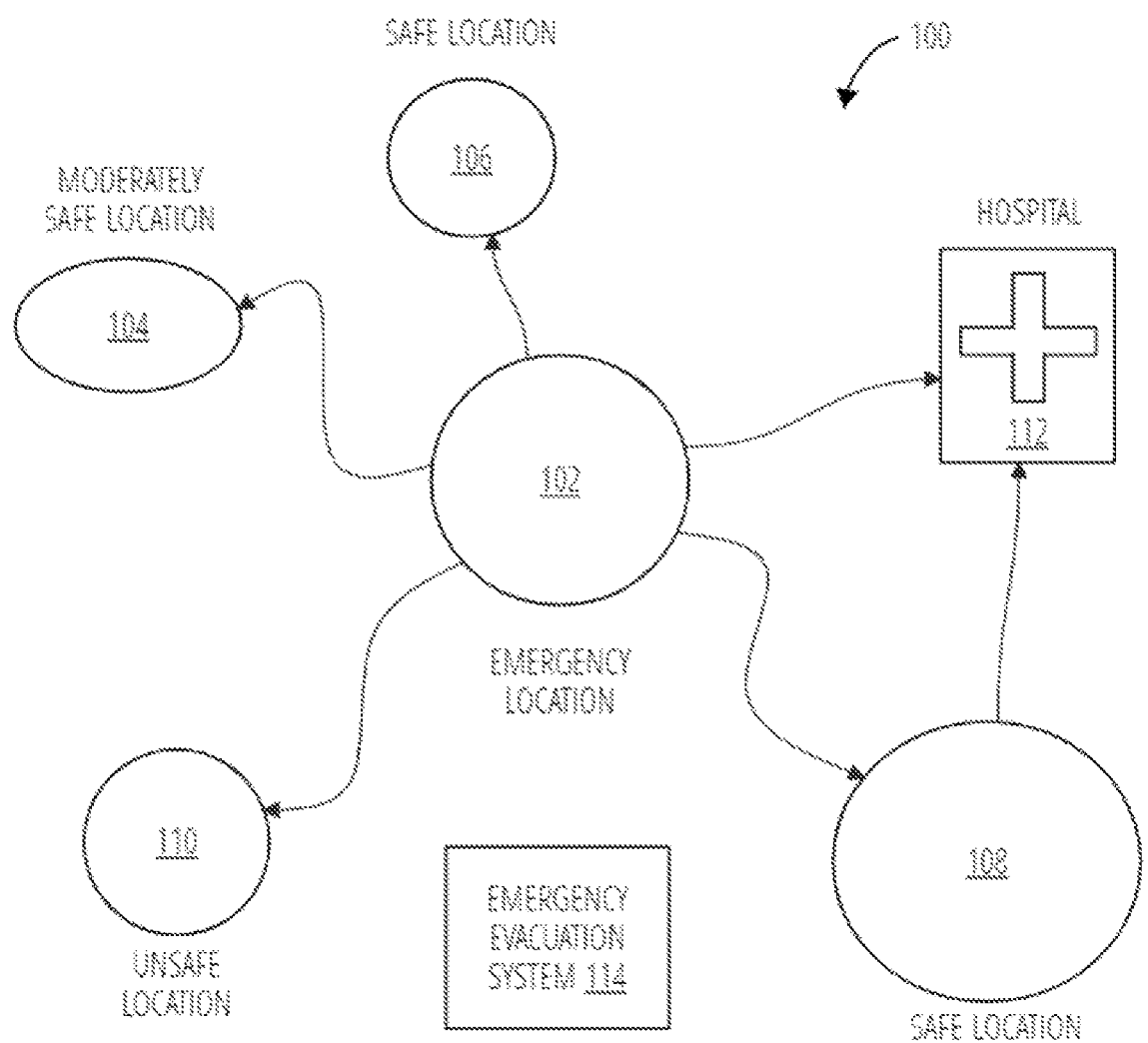
FIG. 1 is a diagram illustrating an environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of emergency evacuation. While the present disclosure is not necessarily limited to such applications, various aspects of the disclosure can be appreciated through a discussion of various examples using this context.

Autonomous vehicles are becoming an increasingly popular mode of transportation. Autonomous vehicles can be used for personal transportation, ride sharing, commercial transportation, and the like. As autonomous vehicles become mainstream, their involvement during emergencies is critical. For example, using autonomous vehicles to aid during emergency evacuations could be greatly beneficial. In particular, leveraging autonomous vehicles can enable efficient evacuation of a large number of people during an emergency.

Aspects of the present disclosure relate to an emergency evacuation system. The emergency evacuation system can be configured to detect an emergency and determine a type of the emergency. Prospective safe locations in the vicinity (e.g., within a particular radius) of the emergency location can be identified. The safety (e.g., a safety rating) of each prospective safe location can be determined based on characteristics (e.g., elevation, floors, area, etc.) of each safe location with respect to the type of emergency. A number of at-risk individuals at the emergency location can then be identified. A set of drop-off locations can be selected from the prospective safe locations. In embodiments, the set of drop-off locations is selected to satisfy a safety threshold and a size limit required for the number of at-risk individuals. Autonomous vehicles required for the evacuation are then determined, and the autonomous vehicles are dispatched to the emergency location. The at-risk individuals are then offloaded at the set of drop-off locations.

The aforementioned emergency evacuation system enables efficient evacuation of at-risk individuals from an emergency location by utilizing autonomous vehicles. The at-risk individuals can be dispatched to locations which are relatively safe for the type of ongoing emergency. Accordingly, aspects of the present disclosure enhance the efficiency and safety of an evacuation during an emergency.

FIG. 1 is a diagram illustrating an environment 100 where an emergency evacuation system 114 manages an evacuation from an emergency location 102, in accordance with embodiments of the present disclosure. The emergency location 102 may have an ongoing emergency. The emergency evacuation system 114 can manage offloading at-risk individuals (e.g., people that require rescuing from an emergency) to safe locations. Emergencies can include natural disasters (e.g., tornados, landslides, earthquakes, avalanches, hurricanes, floods, volcanic eruptions, wildfires, tsunamis, etc.), industrial accidents (e.g., chemical spills, nuclear accidents, etc.), transportation accidents (e.g., road accidents, bridge collapses, train wrecks), structural failures, and other emergencies.

In some embodiments, the emergency evacuation system 114 can first identify prospective safe locations in the vicinity (e.g., proximate to, within a particular radius of, nearby, etc.) of the emergency location 102 (e.g., using mapping and navigation data, such as nearby location geofences). The emergency evacuation system 114 can then classify the prospective safe locations according to a type of the emergency at the emergency location 102. This is completed because the type of the emergency influences whether particular prospective safe locations are safe for that emergency. Factors (e.g., elevation, building characteristics, foliage, etc.) associated with each location can influence whether each location is a safe location for dispatching at-risk individuals. For example, high elevation areas may be safer during floods, open areas (e.g., areas without foliage) may be safer during wildfires, low elevation areas may be safer during tornados, etc. In this example, the emergency evacuation system 114 classifies the prospective safe locations as including a moderately safe location 104, a safe location 106, a safe location 108, an unsafe location 110, and a hospital 112.

In embodiments, the emergency evacuation system 114 can determine a number of at-risk individuals at the emergency location 102. The emergency evacuation system 114 can then determine the location(s) where the at-risk individuals can be dispatched based on the number of at-risk individuals (e.g., by comparing the number of at-risk individuals to a size limit of the one or more prospective safe locations) and the safety of each location. In this example, the emergency evacuation system 114 can prioritize the dispatch of at-risk individuals to safe location 106 and safe location 108, while ensuring injured individuals are dispatched to the hospital 112. However, if the number of at-risk individuals exceeds a size limit of safe location 106 and safe location 108, then the emergency evacuation system 114 may also dispatch at-risk individuals to moderately safe location 104. Thus, the emergency evacuation system 114 designates (e.g., selects) a subset of drop-off locations.

To dispatch at-risk individuals to the drop-off locations, the emergency evacuation system 114 can be configured to request autonomous vehicles. In particular, the autonomous vehicles can be directed to pick up at-risk individuals at the emergency location 102 and drop off at-risk individuals at the determined drop-off locations (e.g., safe location 106, safe location 108, and hospital 112). In embodiments, the at-risk individuals can be characterized prior to pick-up such that the individuals can be organized within the autonomous vehicles and dispatched to appropriate drop-off location(s). For example, the emergency evacuation system 114 may organize family members into a same autonomous vehicle. As another example, the emergency evacuation system 114 may reserve hospital 112 drop-offs for injured individuals.

In embodiments, the emergency evacuation system 114 references an autonomous vehicle database to determine whether there are sufficient autonomous vehicles available (e.g., on standby) to complete the evacuation. If there are sufficient autonomous vehicles, the autonomous vehicles are instructed to evacuate the at-risk individuals from the emergency location 102 and drop the at-risk individuals off at the designated drop-off locations. In embodiments, the autonomous vehicles are provided a route to the emergency location 102, a pick-up order, and a route to the drop-off location(s). If there are insufficient autonomous vehicles, then the emergency evacuation system 114 can be configured to recycle the autonomous vehicles used during the evacuation. In some embodiments, the emergency evacuation system 114 can be configured to request currently occupied autonomous vehicles to aid in assisting during the evacuation. In these embodiments, any requested occupied autonomous vehicles can be made available upon completion of their current task.

In some embodiments, the emergency evacuation system 114 can be configured to designate temporary drop-off locations. In embodiments, at-risk individuals can be transferred from a temporary drop-off location to another drop-off location. For example, an at-risk individual can initially be dispatched to safe location 108, and upon further characterization of the at-risk individual, the at-risk individual can be dispatched to the hospital 112. Upon dispatching all at-risk individuals to the drop-off locations, the evacuation can be considered complete.

It is noted that FIG. 1 depicts an example environment 100 in which illustrative embodiments of the present disclosure may be implemented. In embodiments, individual components may have greater or lesser complexity than as represented in FIG. 1, components other than or in addition to those shown in FIG. 1 may be present, and the number, type, and configuration of such components may vary.

Figure 2:
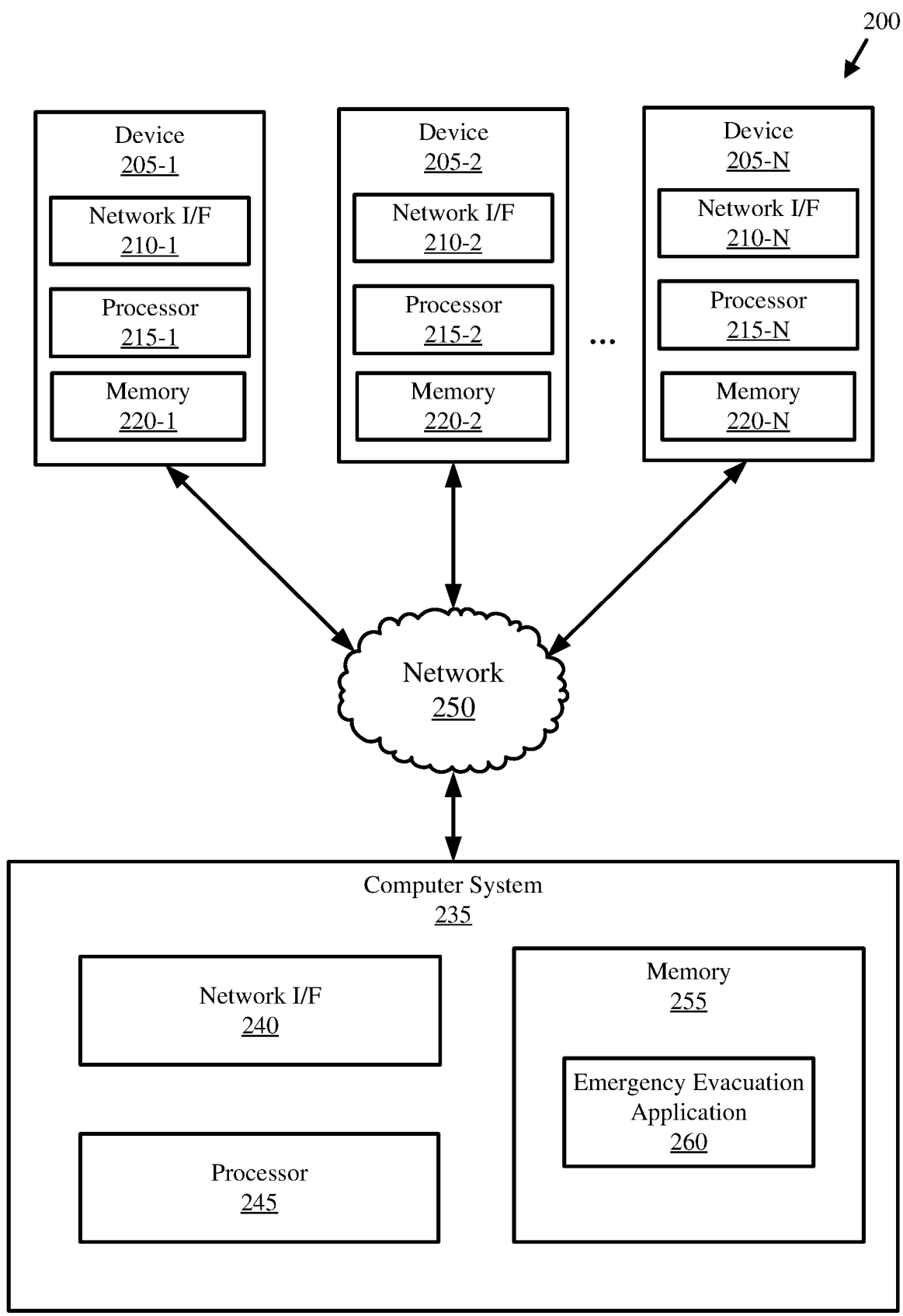
FIG. 2 is a block diagram illustrating a computing environment in which illustrative embodiments of the present disclosure can be implemented.

Turning now to FIG. 2, shown is a block diagram illustrating an example computing environment 200 in which illustrative embodiments of the present disclosure can be implemented. Computing environment 200 includes a plurality of devices 205-1, 205-2 . . . 205-N (collectively referred to as devices 205), at least one computer system 235, and a network 250.

The devices 205 and the computer system 235 include one or more processors 215-1, 215-2 . . . 215-N (collectively referred to as processors 215) and 245 and one or more memories 220-1, 220-2 . . . 220-N (collectively referred to as memories 220) and 255, respectively. The devices 205 and the computer system 235 are configured to communicate with each other through internal or external network interfaces 210-1, 210-2 . . . 210-N (collectively referred to as network interfaces 210) and 240. The network interfaces 210 and 240 are, in some embodiments, modems or network interface cards. The devices 205 and/or the computer system 235 can be equipped with a display or monitor. Additionally, the devices 205 and/or the computer system 235 include optional input devices (e.g., keyboards, mice, scanners, video cameras, global positioning systems (GPS), sensors, etc.) and/or any commercially available or custom software (e.g., browser software, communications software, server software, natural language processing software, search engine and/or web crawling software, mapping and navigation software, etc.). The devices 205 and/or the computer system 235 can be servers, mainframe computers, desktops, laptops, vehicle computer chips, and/or hand-held devices (e.g., smart phones, wearables, or tablets).

The devices 205 and the computer system 235 can be distant from each other and communicate over the network 250. In some embodiments, the computer system 235 can be a central hub from which devices 205 can establish a communication connection, such as in a client-server networking model. Alternatively, the computer system 235 and devices 205 can be configured in any other suitable networking relationship (e.g., in a peer-to-peer (P2P) configuration or using any other network topology).

The network 250 can be implemented using any number of any suitable communications media. For example, the network 250 can be a wide area network (WAN), a local area network (LAN), global area network (GAN), a cellular network, an internet, or an intranet. In certain embodiments, the devices 205 and the computer system 235 can be local to each other and communicate via any appropriate local communication medium. For example, the devices 205 and the computer system 235 can communicate using a local area network (LAN), one or more hardwire connections, a wireless link (e.g., Bluetooth®) or router, or an intranet. In some embodiments, the devices 205 and the computer system 235 can be communicatively coupled using a combination of one or more networks and/or one or more local connections. For example, the first device 205-1 (e.g., a laptop) can be hardwired to the computer system 235 (e.g., connected with an Ethernet cable) while the second device 205-2 (e.g., a mobile phone) can communicate with the computer system 235 using a cellular network, Wi-Fi network, or a wireless link, such as Bluetooth.

In some embodiments, the network 250 is implemented within a cloud computing environment or using one or more cloud computing services. Consistent with various embodiments, a cloud computing environment can include a network-based, distributed-data processing system that provides one or more cloud computing services. Further, a cloud computing environment can include many computers (e.g., hundreds or thousands of computers or more) disposed within one or more data centers and configured to share resources over the network 250.

The computer system 235 includes an emergency evacuation application 260. The emergency evacuation application 260 can be provisioned over the network 250 to, or installed over the network 250 on, the devices 205. Provisioning the software over the network can be completed such that installation on the devices is not necessary.

The emergency evacuation application 260 can be configured to manage evacuation from an emergency location (e.g., emergency location 102 of FIG. 1). The emergency evacuation application 260 can be configured to identify prospective safe locations near an emergency location. The emergency evacuation application 260 can also be configured to determine the safety of the prospective safe locations (e.g., based on the type of emergency). This is completed such that the proper drop-off locations are selected.

The emergency evacuation application 260 can further be configured to determine a number of at-risk individuals at the emergency location. This is completed such that drop-off locations are selected to accommodate the number of at-risk individuals.

The emergency evacuation application 260 can further be configured to request autonomous vehicles for the evacuation. In embodiments, emergency evacuation application 260 can reference an autonomous vehicle database to select available autonomous vehicles for the evacuation. In embodiments, the emergency evacuation application 260 manages the routes taken by, and the grouping of at-risk individuals within, the autonomous vehicles. The routing of autonomous vehicles (e.g., the route to the emergency location and the route from the emergency location to a drop-off location) can be optimized to expedite the evacuation from the emergency location. Similarly, the grouping of at-risk individuals within each autonomous vehicle can also be optimized to expedite evacuation from the emergency location.

In embodiments, the emergency evacuation application 260 can be configured to characterize at-risk individuals such that proper grouping and routing can occur. For example, characterizing at-risk individuals as "injured" can allow grouping injured individuals in a same autonomous vehicle such that they can be routed to a hospital (e.g., hospital 112 of FIG. 1).

While FIG. 2 illustrates a computing environment 200 with a single computer system 235, suitable computing environments for implementing embodiments of this disclosure can include any number of computer systems. The various models, modules, systems, and components illustrated in FIG. 2 can exist, if at all, across a plurality of computer systems and devices. For example, some embodiments can include two computer systems. The two computer systems can be communicatively coupled using any suitable communications connection (e.g., using a wireless WAN, a wireless LAN, a wired connection, an intranet, or the internet).

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. Thus, the configuration of the system can vary, and aspects of the present disclosure are not limited to any particular arrangement described.

Figure 3:
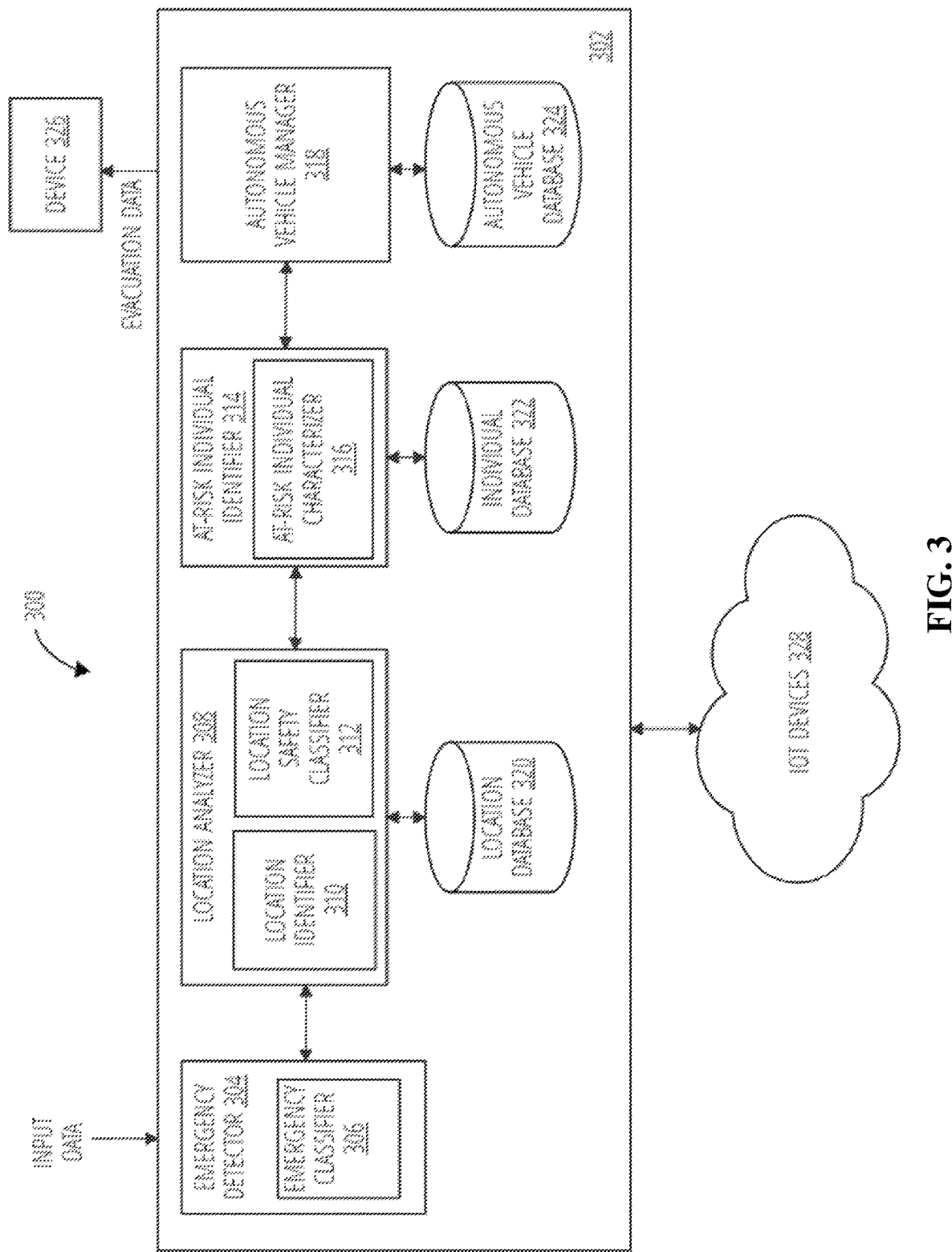
FIG. 3 is a block diagram illustrating another computing environment in which illustrative embodiments of the present disclosure can be implemented.

FIG. 3 is a block diagram illustrating an example computing environment 300 in which illustrative embodiments of the present disclosure can be implemented. The computing environment 300 includes an emergency evacuation system 302 communicatively coupled to internet of things (IoT) devices 328 and a device 326. The emergency evacuation system 302 includes an emergency detector 304, a location analyzer 308, an at-risk individual identifier 314, and an autonomous vehicle manager 318. In embodiments, the emergency detector 304, location analyzer 308, at-risk individual identifier 314, and autonomous vehicle manager 318 can be processor executable instructions that can be executed by a dedicated or shared processor using received inputs (e.g., from IoT devices 328).

Consistent with embodiments of the present disclosure, the emergency detector 304 can be configured to detect an emergency. This can be completed in a variety of manners. In some embodiments, the emergency detector 304 receives input data that indicates an emergency. This input data can be received from at least one user (e.g., an at-risk individual utilizing an emergency evacuation application 260 or an administrator of the emergency evacuation system 302) or a responder (e.g., an authority such as a police department, fire department, security department, etc. that is alerted of the emergency). For example, a user can explicitly indicate (e.g., within a graphical user interface (GUI) associated with the emergency evacuation system 302) an emergency and the emergency detector 304 can receive the indication.

In some embodiments, the emergency detector 304 can detect an emergency via IoT devices 328. For example, various sensors may be coupled to the emergency evacuation system 302, and the sensors may relay an indication of an emergency to the emergency detector 304. As an example, a smoke detector can transmit an indication of a fire emergency to the emergency detector 304. Various sensors can be used to detect an emergency, including, but not limited to, smoke detectors, fire alarms, water alarms, humidity sensors, voltage sensors, wind sensors, seismic sensors, sound sensors, and carbon monoxide sensors.

In some embodiments, the emergency detector 304 can receive an indication of an emergency over a network from an application or device. For example, the emergency detector 304 can receive an emergency indication from an emergency alert service (e.g., a weather service, a government emergency short message service (SMS), an emergency text alert system, etc.).

The emergency detector 304 further includes an emergency classifier 306. The emergency classifier 306 can be configured to determine a type of the emergency. In some embodiments, the emergency classifier 306 can be configured to receive manual input regarding the type of emergency. That is, a user can manually define the type of emergency. In some embodiments, the emergency classifier 306 can be configured to determine the type of emergency based on data received from IoT devices 328. In embodiments, the type of emergency can be determined based on the type of sensor data indicating the emergency. For example, if a smoke detector or fire alarm was used to detect an emergency, the emergency classifier 306 could determine the type of emergency to be "fire." As another example, if a water alarm or humidity detector was used to detect an emergency, then the emergency classifier 306 could determine the type of emergency to be "flood." Similarly, if a seismic sensor detected the emergency, then the emergency classifier 306 could determine the type of emergency to be "earthquake." As another example, if a wind sensor detected the emergency, then the emergency classifier 306 could determine the type of emergency to be "tornado" or "hurricane."

In some embodiments, the emergency classifier 306 can be configured to determine the type of emergency based on data received from an emergency alert service (e.g., a severe weather warning service, such as a weather app). In these embodiments, the type of emergency indicated by the emergency alert service can be used to determine the type of emergency.

In some embodiments, the emergency classifier 306 can be configured to determine the type of emergency using image recognition. For example, IoT devices 328 can include various cameras disposed throughout the environment. In this example, the feed of the cameras throughout the environment could be analyzed (e.g., using image recognition techniques such as convolutional neural networks, clustering, machine learning, gradient matching, grayscale matching, edge detection, etc.) to determine the type of emergency. An example image recognition tool is IBM Watson™ Visual Recognition.

Upon detecting the emergency and classifying a type of the emergency, a location identifier 310 of the location analyzer 308 identifies a location associated with the emergency (e.g., an emergency location). The location identifier 310 further identifies prospective safe locations in the vicinity of the emergency location. In embodiments, location identifier 310 identifies the emergency location based on input data received from a user. For example, a user and/or responder who reported the emergency may indicate an address or location (e.g., intersection, region, county, etc.) where the emergency occurred. The location identifier 310 can then determine the emergency location based on the data received from the user and/or responder.

In some embodiments, the location identifier 310 can identify the location of the emergency based on the location of one or more IoT devices 328 that were used to detect the emergency. For example, the location of a smoke detector, fire alarm, water alarm, humidity sensor, etc. could be used to determine the emergency location. In some embodiments, the location of IoT devices 328 can be manually defined. In some embodiments, the location of the IoT devices 328 can be determined according to a device identifier (e.g., a media access control (MAC) address, internet protocol (IP) address, or other device address) associated with each IoT device. In some embodiments, the location of the IoT devices 328 can be determined using a positioning system. For example, time difference of arrival (e.g., multilateration), angle of arrival, and/or received signal strength indicator (RSSI) values can be used to approximate positions of the IoT devices 328, and thus the emergency location.

In some embodiments, the location identifier 310 determines the location of the emergency based on data received from an emergency alert service. For example, the emergency alert service can issue a warning regarding the address, building, intersection, county, state, coordinates, etc. where the emergency is occurring.

In embodiments, the location identifier 310 can be configured to identify prospective safe locations in the vicinity of the emergency location. In some embodiments, prospective safe locations are identified using a mapping and navigation service (e.g., accessed by, or inherent to, the emergency evacuation system 302). For example, a particular radius around GPS coordinates associated with the emergency location can be surveyed for prospective safe locations. All locations (e.g., defined by GPS coordinates and/or geofences within the mapping and navigation service) within the surveyed radius can then be returned as prospective safe locations. In some embodiments, a location database 320 can be referenced to find locations nearby the emergency location. The location database 320 may include addresses and characteristics (e.g., area, size, floors, etc.) of respective locations. As such, the emergency location and prospective safe locations may be identified within the location database 320.

A location safety classifier 312 can be configured to classify the safety of prospective safe locations in the vicinity of the emergency location. This is completed to select appropriate locations for offloading at-risk individuals. To do so, the location safety classifier 312 compares the type of emergency to one or more characteristics (e.g., factors) of each prospective safe location stored in the location database 320. This is completed because the characteristics of each location dictate whether it is safe for the emergency occurring at the emergency location. For example, a low elevation area may be safe during a tornado, but dangerous during a flood. As another example, an open area (e.g., an area with no foliage) may be safe during a wildfire, but dangerous during a hurricane.

In some embodiments, the location safety classifier 312 can be configured to calculate a safety score for a prospective safe location based on one or more characteristics of that location. For example, assume that during a flood, elevation (e.g., height above sea level) is a primary safety factor. In this example, the safety score can be calculated based on the elevation of the prospective safe location. As an example, assume that a safety score range spans from 0.00 to 1.00, with 1.00 being the highest safety score. Further assume that an elevation range of 0-100 meters linearly correlates with the safety score range, with any elevation greater than 100 meters equating to a safety score value of "1," and any elevation less than 0 meters equating to a safety score of "0." According to this example, if the elevation values for five prospective safe locations are: −10 meters, 20 meters, 55 meters, 95 meters, and 150 meters, the respective safety scores would be 0.00, 0.20, 0.55, 0.95, and 1.00.

As another example, assume that during a wildfire, tree density (e.g., number of trees per acre) is a primary factor used to calculate a safety score. In this example, assume that the safety score range spans from 0.00 to 1.00, with 1.00 being the highest safety score. Further assume that a tree density value of 1,000 trees/acre or more correlates to a safety score of 0.00, a tree density value of 0 trees/acre maps to a safety score of 1.00, and the tree density range from 1,000-0 trees/acre linearly correlates with the safety score range from 0.00-1.00. According to this example, if tree density values for five prospective safe locations are 50,000 trees/acre, 900 trees/acre, 400 trees/acre, 200 trees/acre, and 10 trees/acre, respective safety scores for these five locations would be 0.00, 0.10, 0.60, 0.80, and 0.99. Though the aforementioned examples depict linear correlations between safety factors and safety ratings, in embodiments, non-linear correlations can exist between safety factors and safety ratings (e.g., tree density or elevation ranges can be exponentially correlated with safety rating ranges).

In embodiments, the location safety classifier 312 can consider multiple factors when calculating a safety score. In some embodiments, the location safety classifier 312 can classify the safety of prospective locations using a generic formula safety score (s)=(safetyfactor$_1$ (sf$_1$)×weight$_1$(w$_1$))+ (safetyfactor$_2$ (sf$_2$)×weight$_2$ (w$_2$)) . . . +(safetyfactor$_n$(sf$_n$)× weight$_n$(w$_n$)).

As a detailed example, assume that three safety factors are considered when calculating a safety score for a prospective safe location during a tornado. These three safety factors include elevation, basement presence, and building material. Assume that the elevation safety factor is 0.50, the basement presence safety factor is 1.00 (e.g., basement presence can be binary, with no basement equating to 0 and basement presence equating to 1), and the building material safety factor is 0.00 (e.g., buildings constructed with concrete, brick, or steel can return a safety score of 1, while other materials, such as timber, can return a safety score of 0). In this example, lower elevation can positively affect the safety score, basement presence can positively affect the safety score, and sturdy construction materials (e.g., steel, brick, and concrete) can positively affect the safety score. Further assume that elevation is weighted as 15% of the safety score, basement presence is weighted as 60% of the safety score, and building material is weighted as 25% of the safety score. In this example, the safety score would be calculated as safety score (s)=(0.5×0.15)+(1×0.60)+(0.0×0.25)=0.675. As such, if safety scores from 0.00 to 0.50 are classified as "unsafe," safety scores from 0.50-0.75 are classified as "moderately safe," and safety scores from 0.75 to 1.00 are classified as "safe," then this prospective location would be classified as "moderately safe" during the tornado.

It is to be understood that various factors (e.g., characteristics) can be considered when classifying the safety of prospective locations. These factors can include environmental conditions (e.g., elevation, water (e.g., lake, river, pond) presence, foliage, soil type, etc.), building and/or construction considerations (e.g., contained or open, heating ventilation and air conditioning (HVAC), building materials, number of floors, basement presence, etc.), network presence (e.g., to allow wireless communication to and from the location), food/water availability, and others.

Upon (or before) classifying the safety of locations, a number of at-risk individuals at the emergency location can be identified by an at-risk individual identifier 314. The at-risk individual identifier 314 can be configured to determine the number of at-risk individuals in any suitable manner. In some embodiments, the at-risk individual identifier 314 can be configured to determine the number of at-risk individuals by referencing an individual database 322. The individual database 322 can include a datastore of user profiles. The individual database 322 may also periodically update with the location of the various users within the datastore (e.g., using mapping and navigation software). As such, the at-risk individual identifier 314 can determine the number of users located at the emergency location by referencing the individual database 322.

In some embodiments, users accessing an emergency evacuation application (e.g., emergency evacuation application 260 of FIG. 2) can manually update information (e.g., their location, age, sex, height, weight, etc.) within the individual database 322. This information can be retrieved by an at-risk individual characterizer 316 when determining characteristics of each at-risk individual. At-risk individual characteristics can be used when determining groupings of at-risk individuals within autonomous vehicles and/or routes taken by autonomous vehicles.

In some embodiments, the at-risk individual identifier 314 can be configured to determine the number of at-risk individuals by referencing network log-ins at the emergency location. For example, a number of at-risk individuals can be approximated based on the number of users logging into one or more networks at the emergency location. This can include all public and/or private networks at the emergency location.

In some embodiments, the at-risk individual identifier 314 can be configured to determine the number of at-risk individuals by referencing employment (e.g., payroll) data. For example, the number of at-risk individuals can be approximated based on the number of employees who are currently clocked-in, present at work, or otherwise accounted for at the emergency location.

In some embodiments, the at-risk individual identifier 314 can be configured to determine the number of at-risk individuals by referencing sensor data received from IoT devices 328. In embodiments, optical sensors present at the entrances and exits of the emergency location can update an accurate count of the number of individuals entering and leaving the emergency location (e.g., based on light being blocked by individuals passing an optical sensor). This data can be referenced by the at-risk individual identifier 314 and be used to approximate the number of at-risk individuals present at the emergency location. In embodiments, one or more cameras can be used to capture individuals entering and leaving the emergency location. This can be used by the at-risk individual identifier 314 to determine the number of at risk individuals at the emergency location.

Upon determining the number of at-risk individuals at the emergency location, the number of at-risk individuals is dispatched to the location analyzer 308. The location analyzer 308 can use the number of at-risk individuals to aid in selecting a subset of locations where the at-risk individuals can be dropped off. In embodiments, the location analyzer 308 compares the number of at-risk individuals to a size limit associated with one or more locations which have a safety rating that exceeds a safety threshold. In this way, the location analyzer 308 can select a set of safe locations that can accommodate the number of at-risk individuals.

As referenced herein, a "size limit" can refer to a limit on the number of people that can be accommodated by (e.g., housed within, safely sheltered at, etc.) one or more locations. That is, a "size limit" can represent a limit on the number of people that can be accommodated in a single location, or alternatively, a plurality of locations. For example, if three locations each have a size limit of 100, then the size limit associated with the three locations is 300. Thus, if one or more locations satisfy a size limit required for the number of at-risk individuals, the one or more locations have a capacity that exceeds the number of at-risk individuals. For example, if a number of at-risk individuals is 400, and the size limit of the one or more locations is 300, then the one or more locations do not satisfy a size limit required for the number of at-risk individuals.

As referenced herein, a "subset" of locations can refer to a single location, a group of locations, or the entirety of identified locations in the vicinity of the emergency location.

The size limit associated with one or more locations can be determined in any suitable manner. In some embodiments, the size limit can be determined by referencing the location database 320. For example, each location may include a predetermined capacity (e.g., which can be manually or dynamically defined). The location analyzer 308 can then be configured to reference the capacity of each respective location when determining the size limit. In some embodiments, the size limit of locations can be determined based on the area of the land, lot, building, etc. of the location. For example, a 5,000 square foot parking lot may only be able to accommodate 200 individuals, while a 50,000 square foot parking lot may be able to accommodate 2,000 individuals.

Upon determining the size limit of the one or more locations, a subset of locations with safety ratings satisfying (e.g., exceeding) a safety threshold that can accommodate the number of at-risk individuals can be selected by the location analyzer 308. For example, assume a safety threshold is defined as 0.60 and the at-risk individual identifier 314 identifies 500 at-risk individuals. Further assume that a first location has a safety rating of 0.90 with a size limit of 50, a second location has a safety rating of 0.45 with a size limit of 200, a third location has a safety rating of 0.75 with a size limit of 400, a fourth location has a safety rating of 0.63 with a size limit of 250, and a fifth location has a safety rating of 0.32 with a size limit of 1,000. In this example, the location analyzer 308 would select the first, third, and fourth locations, as each of these locations satisfies the safety threshold and the collective size limit of these locations exceeds the number of at-risk individuals (e.g., the size limit of 700 between the first, third, and fourth locations is able to accommodate 500 at-risk individuals).

In some embodiments, the location analyzer 308 selects a minimum number of safe safety locations required to accommodate the at-risk individuals. For example, following the example above, if the number of at risk-individuals is only 35, then the location analyzer 308 can select only the first location as the drop-off location because the first location can accommodate all at-risk individuals. As another example, if the number of at-risk individuals is 425, only the fourth location can be selected as the drop-off locations (e.g., the fourth location can accommodate all at-risk individuals). This can be completed such that the lowest number of drop-off locations are selected to simplify the logistics associated with the evacuation.

In some embodiments, locations are selected from a highest safety rating to a lowest safety rating until all at-risk individuals can be accommodated. For example, following the example above with 425 at-risk individuals, the first and third locations can be selected as they have the highest safety rating and can accommodate the 425 at-risk individuals, rather than the fourth location, which has a relatively lower safety rating. Though this may add additional drop-off locations, these drop-off locations may have a higher safety rating.

In some embodiments, if the size limit of all locations which satisfy the safety threshold does not exceed the number of at-risk individuals, additional locations can be considered. For example, in some embodiments, the safety threshold can be decreased such that additional locations can be considered for drop-offs. Following the example above, if there are 800 at-risk individuals, then the safety threshold can be decreased to 0.40 such that the second location can be designated as a drop-off location. In this example, the combined size limit of the first, second, third, and fourth locations exceeds the number of at-risk individuals (e.g., the size limit of 900 is greater than 800).

Upon selecting a subset of drop-off locations, the autonomous vehicle manager 318 receives the number of at-risk individuals from the at-risk individual identifier 314 and determines a set of autonomous vehicles required to accommodate the number of at-risk individuals. In embodiments, the autonomous vehicle manager 318 references an autonomous vehicle database 324 to identify autonomous vehicles which can be used during evacuation. The autonomous vehicle database 324 can include a table of autonomous vehicles available to the emergency evacuation system 302. Within the autonomous vehicle database 324, data entries such as the capacity, availability, make, model, VIN number, autonomy level (e.g., fully autonomous or semi-autonomous), and/or other features can be stored with respective vehicles. This information can be referenced by the autonomous vehicle manager 318 such that a determination can be made regarding the appropriate selection of autonomous vehicles required to carry out the evacuation. For example, if there are 100 at-risk individuals, the autonomous vehicle manager 318 can select a set of autonomous vehicles that can safely accommodate the 100 at-risk individuals (e.g., 25 autonomous vehicles that can safely seat four people).

In embodiments, the autonomous vehicle manager 318 references availability data within the autonomous vehicle database 324 when selecting the subset of autonomous vehicles that will be used during the evacuation. The autonomous vehicle database 324 can be dynamically updated based on mapping and navigation data associated with each autonomous vehicle such that an availability status of each vehicle is updated. The autonomous vehicle manager 318 may only consider available autonomous vehicles (e.g., autonomous vehicles not currently in route to a destination) when selecting the subset of autonomous vehicles.

In some embodiments, if all available autonomous vehicles cannot accommodate the number of at-risk individuals, the autonomous vehicle manager 318 can be configured to request occupied autonomous vehicles to aid during the evacuation. The autonomous vehicle manager 318 can, in some embodiments, interrupt ongoing routes taken by autonomous vehicles such that they can be utilized for the emergency evacuation. Alternatively, in some embodiments, the autonomous vehicle manager 318 can request that occupied autonomous vehicles aid in the emergency evacuation after they complete their current route.

In embodiments, the autonomous vehicle database 324 can include an estimated availability time for each respective occupied autonomous vehicle. The autonomous vehicle manager 318 can request occupied autonomous vehicles based on the estimated availability time associated with each autonomous vehicle. For example, the autonomous vehicle manager 318 can request occupied autonomous vehicles which have the earliest availability.

Upon selecting the set of autonomous vehicles required to accommodate the number of at-risk individuals, the autonomous vehicle manager 318 deploys the set of autonomous vehicles to the emergency location. In embodiments, the autonomous vehicle manager 318 manages the routes taken by the autonomous vehicles to the emergency location (e.g., using mapping and navigation services). This can be completed such that safe routes are taken to the emergency location, considering the possible dangers surrounding the emergency.

In some embodiments, the autonomous vehicle manager 318 can be configured to route the autonomous vehicles (e.g., to the emergency location, from the emergency location to a drop-off location, etc.) based on current road conditions. The autonomous vehicle manager 318 can ascertain road conditions and route autonomous vehicles based on road conditions in any suitable manner. In some embodiments, indications of road conditions are received from a mapping and navigation service. In some embodiments, crowdsource data inputs can be leveraged to ascertain road conditions. For example, crowdsource reporting applications can be configured to receive user input regarding current road conditions. In some embodiments, feedback received from the autonomous vehicles can be used to determine road conditions. For example, if a particular autonomous vehicle could not reach its destination based on a road obstruction (e.g., a landslide), then feedback can be reported to the autonomous vehicle manager such that other autonomous vehicles do not take the same route. In some embodiments, road conditions can be manually indicated (e.g., by a first responder).

In embodiments, the autonomous vehicle manager 318 determines groupings of at-risk individuals within the autonomous vehicles. This can be completed based on data received from the at-risk individual characterizer 316. For example, the at-risk individual characterizer 316 can reference details such as family name, nutritional requirements, or any other criteria used to group individuals from the individual database 322 such that a desired grouping within each autonomous vehicle can be determined. In some embodiments, individuals can be grouped based on the various details within the individual database 322. For example, individuals sharing a family name may be grouped in a same autonomous vehicle by the autonomous vehicle manager 318.

Though this disclosure pertains to the collection of personal data (e.g., information stored in the individual database 322), it is noted that in embodiments, users opt-in to the system. In doing so, they are informed of what data is collected and how it will be used, that any collected personal data may be encrypted while being used, that the users can opt-out at any time, and that if they opt-out, any personal data of the user is deleted.

In some embodiments, at-risk individuals can be assigned to autonomous vehicles based on their current health status. For example, data indicative of health status of respective at-risk individuals can be received from IoT devices 328. IoT devices such as biometric sensors (e.g., wearables), cameras, and mobile devices can be configured to determine a current health status of each respective at-risk individual. In some embodiments, the emergency evacuation system 302 can be configured to prompt at-risk individuals to provide a health status (e.g., whether they are injured, have mobility issues, or any other relevant health information). The grouping of individuals within autonomous vehicles can then be completed based on the health status of individuals. For example, injured individuals can be grouped in the same autonomous vehicle such that they can be dispatched to a nearby hospital.

Upon picking up the at-risk individuals at the emergency location, the autonomous vehicle manager 318 can be configured to coordinate routing to the set of drop-off locations selected by the location analyzer 308. In embodiments, the autonomous vehicle manager 318 can utilize updated navigation and mapping services to ensure the autonomous vehicles travel the safest route(s) to their respective drop-off locations.

In some embodiments, the autonomous vehicle manager 318 can coordinate temporary drop-offs to nearby, yet relatively less safe, locations to ensure that as many at-risk individuals are removed from the emergency location as soon as possible. The autonomous vehicle manager 318 can thereafter direct the autonomous vehicles to transfer the at-risk individuals located at temporary drop-off locations to farther, yet relatively safer, locations.

The emergency evacuation system 302 can transmit evacuation data to the device 326. The device 326 can, in some embodiments, be an autonomous vehicle or mobile device associated with an at-risk individual. For example, evacuation data transmitted to an autonomous vehicle can include the route to the emergency location, the at-risk individual(s) assigned to the autonomous vehicle, and the route taken from the emergency location to a drop-off location. As another example, evacuation data transmitted to a mobile device of an at-risk individual can include an autonomous vehicle assigned to the at-risk individual as well as their designated drop-off location.

Upon offloading at-risk individuals at their respective drop-off locations, the emergency evacuation can be considered complete. The emergency evacuation system 302 can then await another emergency detection by the emergency detector 304.

In some embodiments, if the emergency evacuation is not yet complete (e.g., all at-risk individuals are not evacuated from the emergency location), the autonomous vehicle manager 318 can be configured to recycle autonomous vehicles to be used for evacuation. That is, if a particular autonomous vehicle already offloaded its assigned at-risk individuals at their designated drop-off, the autonomous vehicle manager 318 can assign another set of at-risk individuals located at the emergency location to the autonomous vehicle, and request that the autonomous vehicle aid in evacuating the second set of at-risk individuals from the emergency location. At-risk individuals remaining at the emergency location can be determined by referencing their updated location (e.g., within individual database 322).

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary. Thus, the configuration of the system can vary, and aspects of the present disclosure are not limited to any particular arrangement described.

Figure 4:
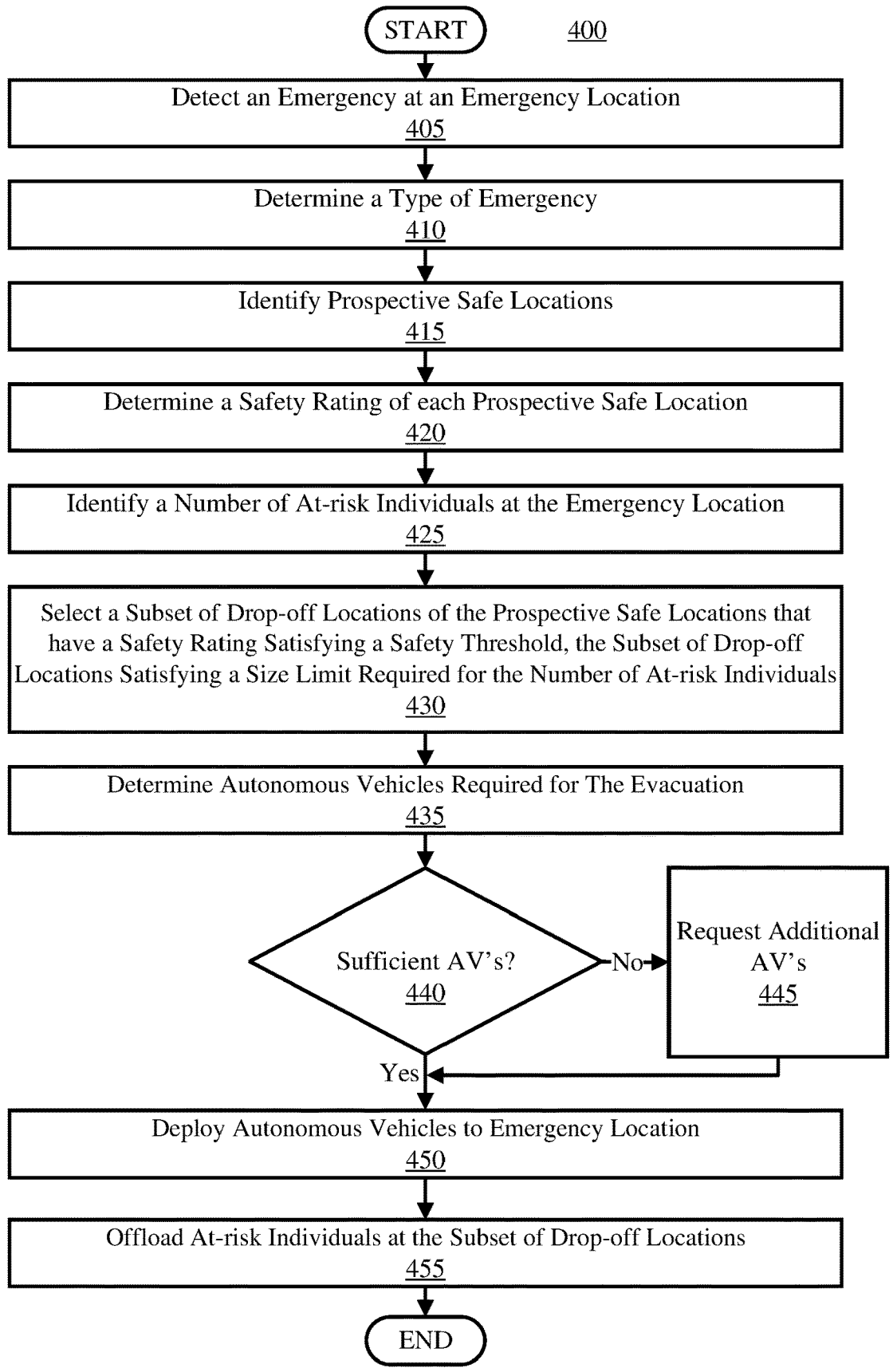
FIG. 4 is a flow-diagram illustrating an example method for performing an emergency evacuation, in accordance with embodiments of the present disclosure.

Referring now to FIG. 4, shown is an example method 400 for performing an emergency evacuation, in accordance with embodiments of the present disclosure.

Method 400 initiates at operation 405, where an emergency is detected at an emergency location. In embodiments, the emergency can be detected in the same, or a substantially similar, manner to the techniques described with respect to the emergency detector 304 of FIG. 3. For example, the emergency can be detected based on user input, data received from IoT sensors, or data received from an emergency alert service.

A type of the emergency is then determined. This is illustrated at operation 410. The type of emergency can be determined in the same, or a substantially similar, manner as the techniques described with respect to the emergency classifier 306 of FIG. 3. For example, the type of emergency can be determined based on the type of sensor and/or alarm which detected the emergency. In some embodiments, the type of emergency can be manually defined by a user who indicated the emergency. In some embodiments, the type of emergency can be indicated by an emergency alert service.

Prospective safe locations in the vicinity of the emergency location are then identified. This is illustrated at operation 415. Prospective safe locations can be determined in the same, or a substantially similar, manner as the techniques described with respect to the location identifier 310 of FIG. 3. For example, GPS coordinates and/or geofences corresponding to locations (e.g., according to a mapping and navigation service) within a particular radius of the emergency location can be identified as prospective safe locations.

A safety rating is then determined for each prospective safe location. This is illustrated at operation 420. The safety rating of each prospective safe location can be determined using the same, or substantially similar, techniques described with respect to the location safety classifier 312 of FIG. 3. For example, characteristics of each prospective safety location can be compared to the type of emergency to determine a safety rating.

A number of at-risk individuals at the emergency location is then identified. This is illustrated at operation 425. The number of at-risk individuals can be identified in the same, or a substantially similar, manner as the techniques described with respect to the at-risk individual identifier 314 of FIG. 3. For example, the number of at-risk individuals can be identified using network data (e.g., the number of network log-ins), employment data, or by referencing an individual database with updated locations of each user within the individual database.

A subset of drop-off locations of the prospective safe locations having a safety rating satisfying a safety threshold and having a size limit suitable to accommodate the number of at-risk individuals is then selected. This is illustrated at operation 430. Selecting the subset of drop-off locations can be completed in the same, or a substantially similar, manner as the techniques described with respect to the location analyzer 308 of FIG. 3. For example, a minimum number of locations classified as safe (e.g., based on a safety threshold) required to accommodate the at-risk number of individuals can be selected.

Autonomous vehicles required for the emergency evacuation are then determined. This is illustrated at operation 435. The autonomous vehicles required for the emergency evacuation can be determined and selected in the same, or a substantially similar, manner as the techniques described with respect to the autonomous vehicle manager 318 of FIG. 3. For example, an autonomous vehicle database including information (e.g., availability, capacity, etc.) for respective autonomous vehicles can be referenced to select a list (e.g., set) of autonomous vehicles to be used during the evacuation.

A determination is made whether there are sufficient autonomous vehicles to complete the evacuation. This is illustrated at operation 440. This can be completed by determining whether the set of autonomous vehicles determined at operation 435 is available (e.g., by referencing an availability data column within an autonomous vehicle database).

If a determination is made that there are insufficient autonomous vehicles, then additional autonomous vehicles are requested. This is illustrated at operation 445. In embodiments, autonomous vehicles which are currently occupied can be requested. The autonomous vehicles can be made available upon completion of their current route, or alternatively, instantly by interrupting their current route. In some embodiments, autonomous vehicles selected for the emergency evacuation can be recycled such that they pick up and drop off individuals until all at-risk individuals are evacuated.

If a determination is made that there are sufficient autonomous vehicles, or after additional autonomous vehicles are requested (or if autonomous vehicles are recycled), the autonomous vehicles are deployed to the emergency location. This is illustrated at operation 450. In embodiments, the autonomous vehicles are deployed to the emergency location using the same, or substantially similar, techniques described with respect to the autonomous vehicle manager 318 of FIG. 3. For example, autonomous vehicles can travel to the location of the emergency location (e.g., identified by the location identifier 310) using mapping and navigation services. The autonomous vehicles are then loaded with their designated at-risk individuals.

The at-risk individuals are then offloaded at the subset of drop-off locations. This is illustrated at operation 455. In embodiments, each autonomous vehicle travels to their designated drop-off location and drops off their load of assigned individuals. In embodiments, the set of autonomous vehicles is directed, by a processor, to offload the at-risk individuals at the subset of drop-off locations. In some embodiments, autonomous vehicles which offload at-risk individuals can be requested to return to the emergency location to further aid in evacuating at-risk individuals.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
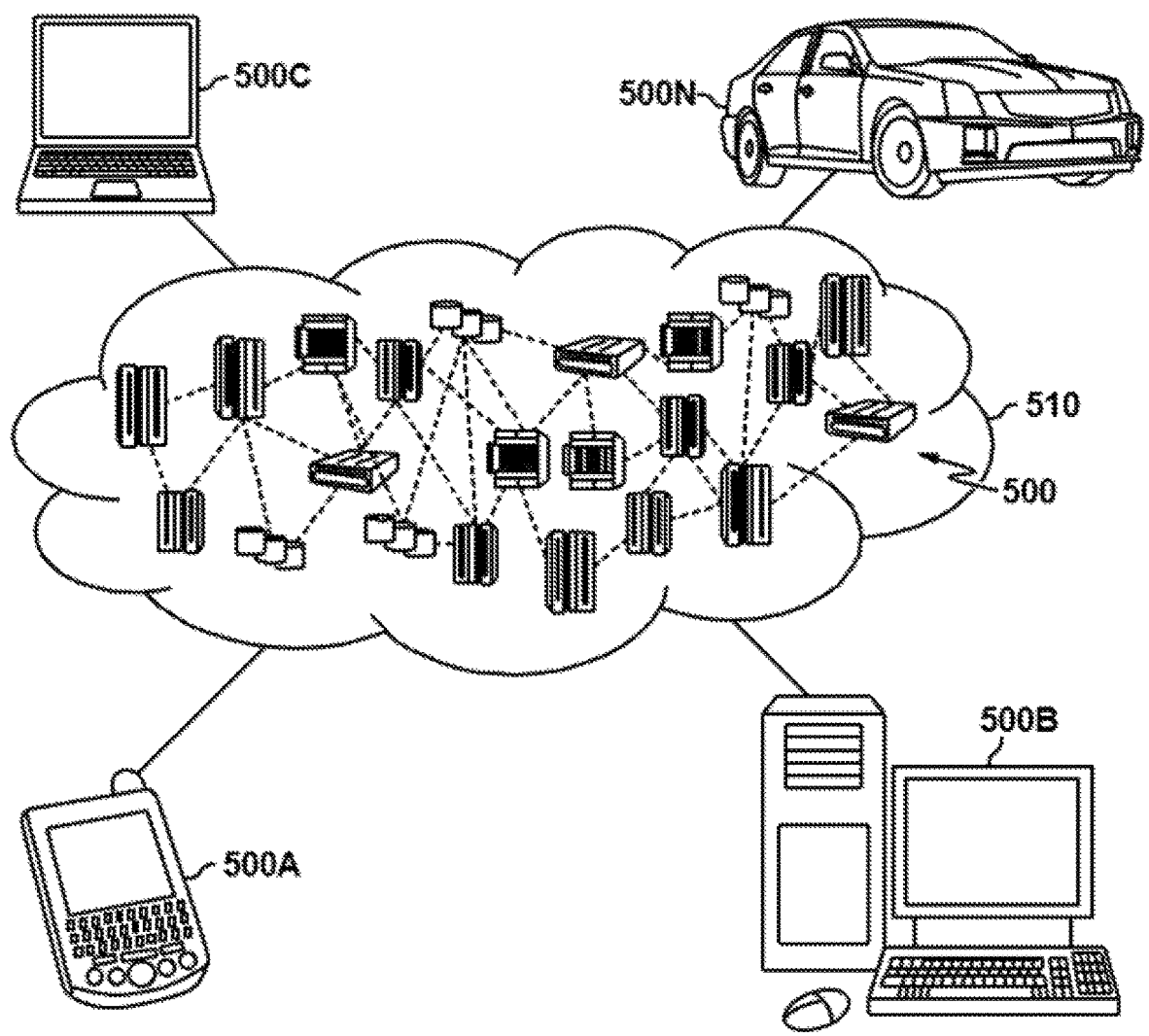
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A (e.g., emergency evacuation system 114, devices 205, computer system 235, emergency evacuation system 302, device 326, IoT devices 328), desktop computer 500B (e.g., emergency evacuation system 114, devices 205, computer system 235, emergency evacuation system 302, device 326, IoT devices 328) laptop computer 500C (e.g., emergency evacuation system 114, devices 205, computer system 235, emergency evacuation system 302, device 326, IoT devices 328), and/or automobile computer system 500N (e.g., devices 205, device 326, IoT devices 328) may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
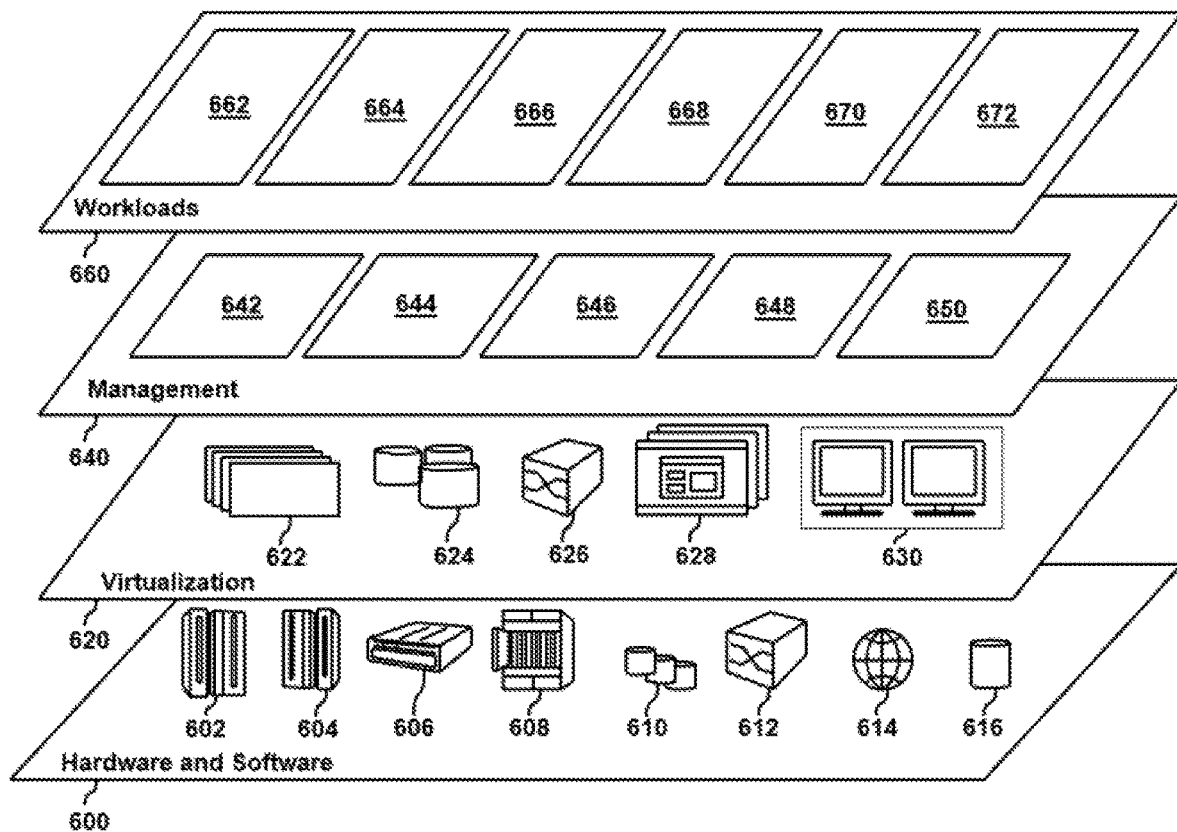
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 may allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and emergency evacuation 672.

Figure 7:
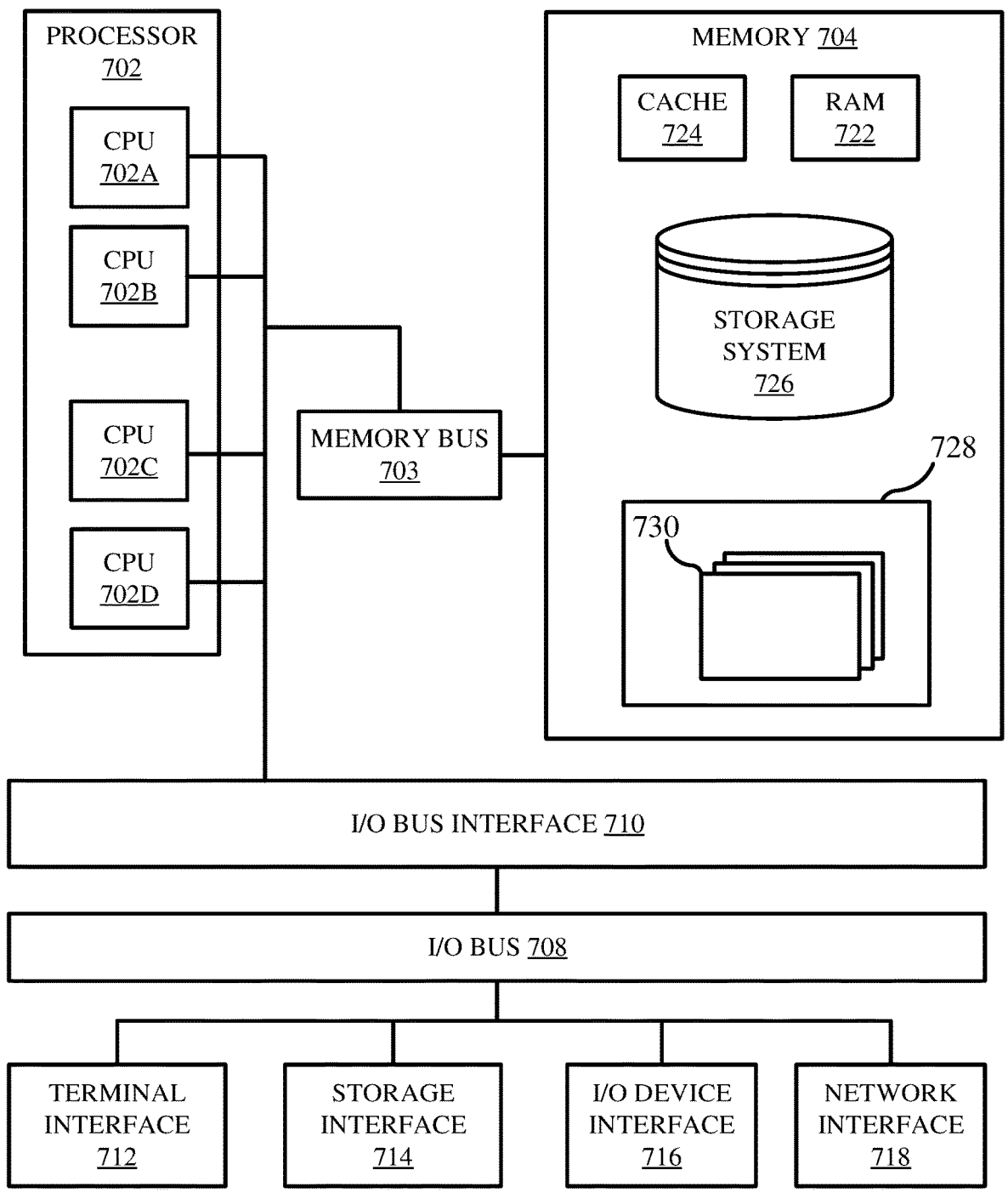
FIG. 7 is a high-level block diagram illustrating an example computer system that can be used in implementing one or more of the methods, tools, and modules, and any related functions, described herein, in accordance with embodiments of the present disclosure.

Referring now to FIG. 7, shown is a high-level block diagram of an example computer system 701 (e.g., emergency evacuation system 114, devices 205, computer system 235, emergency evacuation system 302, device 326, IoT devices 328) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 may include an emergency evacuation module. The emergency evacuation module can be configured to detect an emergency at an emergency location and determine a type of the emergency. The emergency evacuation module can further be configured to identify prospective safe locations in a vicinity of the emergency location. The emergency evacuation module can further be configured to determine a safety rating of each prospective safe location based on the type of emergency. A number of at-risk individuals at the emergency location can be determined by the emergency evacuation module. The emergency evacuation module can be configured to select a subset of drop-off locations of the prospective safe locations based on the safety ratings and a size limit required to accommodate the number of at-risk individuals. The emergency evacuation module can further be configured to determine autonomous vehicles required for the evacuation. The autonomous vehicles can then be deployed to the emergency location by the emergency evacuation module. The emergency evacuation module can then command the autonomous vehicles to offload the at-risk individuals at the subset of drop-off locations.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

Referring now to FIG. 8, shown is an example code 800 for risk stratification and predictive risk determination considering an area under focus and a cluster tone analysis through normalization and feature scaling. In embodiments, tone analysis of at-risk individuals can be completed such that the safety of locations can be determined. In embodiments, the risk stratification can be completed using a long short-term memory (LSTM) convolutional neural network (CNN).

A pseudo algorithm used to complete a risk-stratification and predictive risk determination is as follows:

A sequence of events E (E1, E2 ... EN) over a period of time T (T1, T2 ... TN) in a confined location L from a series of locations L (L1, L2 ... LN) can be monitored.

IoT devices (e.g., cameras, autonomous vehicle sensors, mobile devices, wearables, etc.) in a particular distance from a risk zone running a LSTM-CNN can be used for monitoring a user's risk Pi, at the time T of event E. In embodiments, a cloud engine having visual recognition capabilities can be used to aid in classifying the user's risk Pi based on data received from IoT devices.

After calculating the user risk Pi, speech signals are gathered from the user via message queuing telemetry transport (MQTT) enabled machine-to-machine (M2M) communication at the location L, at time T, and during event E: Li(Ei, Ti). The speech signals are analyzed using mel-frequency cepstral coefficients (MFCCs) conversion analysis with a Gaussian mixture model (GMM) to identify a speaker S amongst a plurality of users P (P1, P2 ... PN) in the location L. A reference R is then established to map the user's clusters Pki to a specific logged setting Ls, where the logged setting Ls refers to the user's risk-level in certain situation A, yielding R(Ei, Ti)→(Pi, Ls) at location Li.

Weights can then be applied on distance of cluster set from the emergency location L and recorded data Ls based on the following table:

| Distance | Weight |
| --- | --- |
| 0 miles <= d <= 2 miles | 1 |
| 2 miles < d < 10 miles | (10 − x)/8 |
| 10 miles <= d | 0 |

The function $Y=1/(1+\exp(-Pki(d-x-n)))$ is then obtained based on the output of the LSTM CNN model when the distance metrics d and weights as shown above are input into the system followed by clustering the weights based on reference location and user activity. In this equation, Pki is the clustered risk stratified network, n is the number of autonomous vehicles, d is the current distance from the emergency location, and x is a panic level of a user from 0-1. The activity information Ai at the location Li then establishes the reference for calling more autonomous vehicles from the sample set of n autonomous vehicles in the vicinity over a particular time period. A pearson correlation is then deployed for similarity analysis based on risk and health metrics as shown in the code 800.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   detecting, by a processor, an emergency at an emergency location;
   determining, by the processor, a type of the emergency;
   identifying, by the processor, prospective safe locations proximate to the emergency location;
   determining, by the processor, a safety rating of each prospective safe location based on the type of emergency;
   determining, by the processor, a number of at-risk individuals at the emergency location;
   selecting, by the processor, a subset of drop-off locations of the prospective safe locations that have a safety rating satisfying a safety threshold, the subset of drop-off locations satisfying a size limit required for the number of at-risk individuals;

determining, by the processor, a set of autonomous vehicles required for the number of at-risk individuals; and deploying, by the processor, the set of autonomous vehicles to the emergency location.

2. The method of claim 1, wherein the type of emergency is determined based on a type of sensor that detected the emergency at the emergency location.

3. The method of claim 1, wherein the safety rating of each prospective safe location is determined by adding a set of weighted safety factors.

4. The method of claim 3, wherein a value of each weighted safety factor depends on the type of emergency.

5. The method of claim 1, further comprising:
directing, by the processor, the set of autonomous vehicles to offload the at-risk individuals at the subset of drop-off locations.

6. The method of claim 1, wherein the set of autonomous vehicles is determined by referencing an autonomous vehicle database containing a plurality of autonomous vehicles, the autonomous vehicle database indicating a capacity and availability of each autonomous vehicle of the plurality of autonomous vehicles.

7. A computer program product comprising a computer readable storage medium having program instructions embodied therewith, the program instructions executable by a processor to cause the processor to perform a method comprising:
detecting an emergency at an emergency location;
determining a type of the emergency;
identifying prospective safe locations proximate to the emergency location;
determining a safety rating of each prospective safe location based on the type of emergency;
determining a number of at-risk individuals at the emergency location;
selecting a subset of drop-off locations of the prospective safe locations that have a safety rating satisfying a safety threshold, the subset of drop-off locations satisfying a size limit required for the number of at-risk individuals;
determining a set of autonomous vehicles required for the number of at-risk individuals; and
deploying the set of autonomous vehicles to the emergency location.

8. The computer program product of claim 7, wherein the method performed by the processor further comprises:
directing the set of autonomous vehicles to offload the at-risk individuals at the subset of drop-off locations;
determining whether there are any remaining at-risk individuals at the emergency location; and
requesting, in response to determining that there are remaining at-risk individuals at the emergency location, that at least one autonomous vehicle of the set of autonomous vehicles returns to the emergency location to evacuate additional at-risk individuals.

9. The computer program product of claim 8, wherein determining whether there are any remaining at-risk individuals at the emergency location includes:
comparing an updated location of each at-risk individual to the emergency location.

10. The computer program product of claim 7, wherein the set of autonomous vehicles are deployed to the emergency location based on current road conditions.

11. The computer program product of claim 7, wherein the size limit of the subset of locations is determined by referencing a location database.

12. The computer program product of claim 7, wherein the number of at-risk individuals is determined by at least one optical sensor that tracks individuals entering and leaving the emergency location.

13. The computer program product of claim 7, wherein the emergency location is determined based on a device address associated with a sensor which detected the emergency.

14. The computer program product of claim 7, wherein the set of autonomous vehicles is determined by referencing an autonomous vehicle database containing a plurality of autonomous vehicles, the autonomous vehicle database indicating a capacity and availability of each autonomous vehicle of the plurality of autonomous vehicles.

15. A system comprising:
a memory storing program instructions; and
a processor, wherein the processor is configured to execute the program instructions to perform a method comprising:
detecting an indication of an emergency at an emergency location;
determining a type of the emergency;
identifying prospective safe locations proximate to the emergency location;
determining a safety rating of each prospective safe location based on the type of emergency;
determining a number of at-risk individuals at the emergency location;
selecting a subset of drop-off locations of the prospective safe locations that have a safety rating satisfying a safety threshold, the subset of drop-off locations satisfying a size limit required for the number of at-risk individuals;
determining a set of autonomous vehicles required for the number of at-risk individuals; and
deploying the set of autonomous vehicles to the emergency location.

16. The system of claim 15, wherein the type of emergency is determined based on a type of sensor that detected the emergency at the emergency location.

17. The system of claim 15, wherein the method performed by the processor further comprises:
directing the set of autonomous vehicles to offload the at-risk individuals at the subset of drop-off locations.

18. The system of claim 15, wherein the emergency location is determined by using time difference of arrival multilateration between a sensor that detected the emergency and at least two other devices.

19. The system of claim 15, wherein at-risk individuals are grouped within each autonomous vehicle of the set of autonomous vehicles based on characteristics of each at-risk individual.

20. The system of claim 15, wherein the method performed by the processor further comprises:
determining whether there are any remaining at-risk individuals at the emergency location; and
requesting, in response to determining that there are remaining at-risk individuals at the emergency location, that at least one autonomous vehicle of the set of autonomous vehicles returns to the emergency location to evacuate additional at-risk individuals.

* * * * *